(12) United States Patent  
Shimokawa

(10) Patent No.: US 7,045,215 B2  
(45) Date of Patent: May 16, 2006

(54) MAGNETIC RECORDING DISK AND PROCESS FOR MANUFACTURE THEREOF

(75) Inventor: Koichi Shimokawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 267 days.

(21) Appl. No.: 10/765,222

(22) Filed: Jan. 28, 2004

(65) Prior Publication Data

US 2004/0185262 A1 Sep. 23, 2004

(30) Foreign Application Priority Data

Jan. 29, 2003 (JP) ....................... 2003-020091  
Nov. 21, 2003 (JP) ....................... 2003-391829

(51) Int. Cl.  
  *G11B 5/71* (2006.01)

(52) U.S. Cl. .................. 428/421; 428/694 TF

(58) Field of Classification Search ................ 428/421, 428/694 TF  
See application file for complete search history.

(56) References Cited

U.S. PATENT DOCUMENTS 5,750,747 A * 5/1998 Furutani et al. ............. 554/36  
6,348,266 B1 * 2/2002 Liu et al. .................... 428/421

FOREIGN PATENT DOCUMENTS

JP  11-22419 A  8/1999

* cited by examiner

*Primary Examiner*—Stevan A. Resan  
(74) *Attorney, Agent, or Firm*—Nixon & Vanderye P.C.

(57) ABSTRACT

A magnetic recording disk has a high-adhesion lubricant layer that permits an operation at an extremely low level of flying height of 12 nm or less without troubles and which is capable of preventing the migration at a high-speed rotation, and comprises a substrate, a magnetic layer formed on the substrate, a protective layer formed on the magnetic layer and a lubricant layer formed on the protective layer, the lubricant layer containing a compound (A) of the general formula (I),

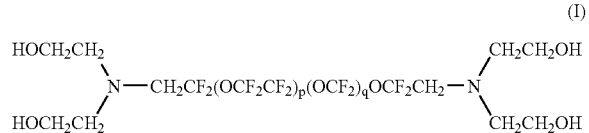

wherein each of p and q is an integer of 1 or more, and a compound (B) having a perfluoropolyether main chain having two end moieties each of which contains a carbon atom or an oxygen atom to which a hydroxyl-containing hydrocarbon group that optionally contains ether bond(s) is bonded, and a process for the manufacture thereof is provided.

10 Claims, 1 Drawing Sheet

MAGNETIC RECORDING DISK AND PROCESS FOR MANUFACTURE THEREOF

TECHNICAL BACKGROUND

1. Field of the Invention

The present invention relates to a magnetic recording disk and a process for the manufacture thereof. More specifically, the present invention relates to a magnetic recording disk which has a high-adhesion lubricant layer so that a fly stiction trouble or a corrosion trouble can be prevented even at an extremely low level of flying height, for example, of 12 nm or less and that migration can be prevented even at a high-speed rotation, for example, of 5,400 rpm or more and which is to be mounted on a magnetic recording disk unit such as a hard disk drive unit (HDD), and a process for manufacture thereof.

2. Statement of Related Art

Conventionally, a magnetic recording disk unit employs a CSS (Contact Start and Stop) method in which a magnetic head is kept in contact with a contact start and stop region (CSS region) formed in an inner-circumferential region at a stop time, the magnetic head is allowed to come up slightly at a starting time while it is allowed to contact-slide in the CSS region and then, writing and reading are performed in the surface of a write-read disk region formed outside the CSS region. When the operation is ended, the magnetic head is brought back to the CSS region from the write-read disk region and then allowed to land while it is allowed to contact-slide in the CSS region, and the magnetic head is stopped. In the above CSS method, the starting operation and ending operation which involve the contact-sliding will be called a CSS operation.

In a magnetic recording disk for use in the above CSS method, it is required to form both a CSS region and a write-read region on the disk surface. For preventing the attachment (stiction) of the magnetic head and the magnetic recording disk when they are in contact, further, it is required to form a roughened form having a predetermined surface roughness called a texture on the magnetic recording disk surface. For alleviating damage caused by the contact-sliding of the magnetic head and the magnetic recording disk during the CSS operation, there are known, for example, a magnetic recording medium (e.g., JP-A-62-66417) having a coating formed of a perfluoroalkylpolyether having the structural formula,

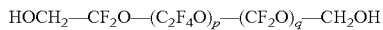

$$HOCH_2—CF_2O—(C_2F_4O)_p—(CF_2O)_q—CH_2OH$$

and a lubricant containing a phosphazene compound as a main component and being to be applied to a hard magnetic recording disk (e.g., JP-A-11-224419).

Recently, the above CSS method is being replaced with a magnetic recording disk according to a load unload method (LUL method). In the LUL method, a magnetic head is kept on a sloping seat called a ramp positioned outside a magnetic recording disk at a stop time, and at a starting time, the magnetic head is allowed to slide from the above ramp onto the magnetic recording disk after the magnetic recording disk starts turning, followed by writing and reading. The above series of operations will be called "LUL operation". The LUL method is preferred for increasing the information recording capacity since a wide writing and reading region on the magnetic recording disk can be secured as compared with the CSS method. Further, since it is not required to form the texture for CSS on the magnetic recording disk surface, the magnetic recording disk surface can be smoothened to a great extent, and the flying height of the magnetic head can be further decreased, so that a higher S/N ratio of recording signals can be attained. The LUL method is therefore suitable.

As the flying height of the magnetic head is further discontinuously decreasing due to the introduction of the above LUL method, it is required to attain stable operation of the magnetic head even at an extremely low level of a flying height of 12 nm or less. However, when the magnetic head is allowed to fly above a magnetic recording disk surface at such a very low flying height level, there is caused a problem that fly stiction and head corrosion troubles frequently take place.

The fly stiction trouble refers to a trouble that a magnetic head is caused to have a fluctuation in flying position and a flying height level during its flying. The trouble involves irregular fluctuations in reproduction output, and in some cases, a magnetic head comes into contact with a magnetic recording disk to cause a head clash, and the magnetic recording disk may be destroyed.

The corrosion trouble refers to a trouble that the element portion of a magnetic head is corroded to cause difficulties in reproducing written data, and in some cases, the reproduction may be no longer possible, or the corroded element may expand to cause damage on the magnetic recording disk surface during the flying of the magnetic head.

Further, it is recent practice to increase the turning rate of a magnetic recording disk for enhancing the response of a magnetic recording disk drive unit. Conventionally, the small 2.5-inch magnetic recording disk drive unit suitable for mobile devices has a turning rate of approximately 4,200 rpm, while it is recent practice to turn a magnetic recording disk at a high rate of 5,400 rpm or more for increasing the response capability. When a magnetic recording disk is turned at such a high rate, a lubricant layer moves (migrates) due to a centrifugal force caused by the turning, and there comes to clearly appear a phenomenon in which the lubricant layer comes to have a non-uniform thickness in the magnetic recording disk surface. When the thickness of the lubricant layer increases on the outer-circumferential side of the disk, a fly sticking trouble or a head clash trouble is liable to take place at the time of LUL. When the thickness of the lubricant layer decreases on the inner-circumferential side of the disk, the lubricity performance decreases, and a head clash trouble is liable to take place.

Conventional lubricants described in JP-A-62-66417 and in JP-A-11-224419 are those that have been developed with mainly aiming at improving the CSS operation. When such a lubricant is used in a magnetic recording disk according to the LUL method, the above troubles take place highly frequently, and it is difficult to satisfy the reliability that magnetic recording disks are recently required to have. It is therefore made difficult to attain higher capacity of a magnetic recording disk, a higher S/N ratio and faster response in a magnetic recording disk according to the LUL method.

Under the circumstances, it is therefore an object of the present invention to provide a magnetic recording disk having a high-adhesion lubricant layer that can prevent fly stiction and corrosion trouble at an extremely low level of flying height, for example, of 12 nm or less, and which can prevent migration at a turning rate, for example, of 5,400 rpm or more, and a process for the manufacture thereof. Particularly, the present invention aims at providing a magnetic recording disk suitable for the LUL method and a process for the manufacture thereof.

SUMMARY OF THE INVENTION

For achieving the above object, the present inventors have made diligent studies on the above problems that recently appear in magnetic recording disks, and it has been found that the problems are results of the occurrence of the following mechanism.

When the flying height of a magnetic head comes to be an extremely small flying height of 12 nm or less, the magnetic head exerts adiabatic compression and adiabatic expansion repeatedly on a lubricant layer on the surface of a magnetic recording disk through air molecules during its flying, and the lubricant layer is repeatedly heated and cooled by the above thermal action. From this point of view, the present inventors have made further studies and found that the above thermal action promotes the pyrolysis of a lubricant constituting the lubricant layer so that the lubricant is reducible to lower molecules. When the lubricant is reduced to low molecules due to the pyrolysis, the flowability of the lubricant increases due to its lower molecules, so that the adhesion between the lubricant layer and a protective layer is degraded. As a result, lubricant having an increased flowability is transferred to, and deposited on, a magnetic head positioned within an extremely small distance from the magnetic recording disk, so that the flying position of the magnetic head is destabilized, which causes a fly stiction trouble.

Particularly, it has been found that a magnetic head having a recently introduced NPAB (negative pressure air bearing surface) slider sucks a decomposition product of a lubricant from the surface of magnetic recording disk due to a high negative pressure that occurs on the lower surface of the magnetic head, which promotes the transfer and deposition phenomenon.

It has been also found that the lubricant, when thermally decomposed, forms hydrofluoric acid in some cases, and that the hydrofluoric acid is liable to corrode the element portion of a magnetic head as a result of transfer and deposition thereof to/on the magnetic head.

It has been further found that a magneto-resistance effect reproducing element (MR, GMR, TMR, etc.) used in a magnetic head as being suitable for higher-density recording is easily corroded, and that a shielding material that gives a high Bs (magnetic flux density) such as FeNi-containing permalloy, which is used in the shielding portion of a magnetic head having a magneto-resistance effect reproducing element, is also liable to be corroded.

Particularly, it has been found that the lubricant described in the above JP-A-62-66417 has low heat durability, tends to be thermally decomposed and is therefore liable to cause troubles due to these phenomena.

It has been further found that the hydrofluoric acid generated by the pyrolysis of a lubricant tends to cause siloxane present in the atmosphere of a magnetic recording disk device to chemically change to form silicon oxide and that the thus-formed silicon oxide is liable to be transferred to a magnetic head to cause a fly stiction trouble.

The present inventors have further found that the LUL method aggravates the above troubles. In the LUL method, a magnetic head does not slide on the surface of a magnetic recording disk while being in contact thereto, unlike the CSS method, so that a decomposition product of a lubricant that is once transferred to the magnetic head is no longer transferred, or removed back, to the magnetic recording disk side. In the CSS method, the CSS region of a magnetic recording disk works to clean away a decomposition product adhering to a magnetic head during the CSS operation, and it is hence thought that the above troubles therefore do not appear clearly.

The present inventors have made further studies on the basis of the above results and as a result found that the above problems can be suppressed by employing, as a lubricant layer on a magnetic recording disk, a lubricant layer containing a combination of two specifically structured compounds having perfluoropolyether main chains in which end moieties of each compound are modified, and the present invention has been accordingly completed.

That is, the subject matters of the present invention are as follows.

(1) A magnetic recording disk comprising a substrate, a magnetic layer formed on the substrate, a protective layer formed on the magnetic layer and a lubricant layer formed on the protective layer, the lubricant layer containing a compound (A) of the general formula (I),

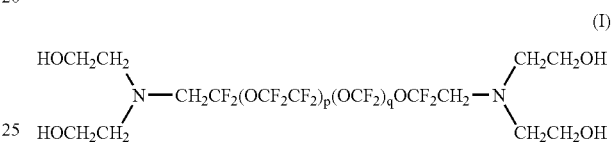

wherein each of p and q is an integer of 1 or more, and
a compound (B) having a perfluoropolyether main chain having two end moieties each of which contains a carbon atom or an oxygen atom to which a hydroxyl-containing hydrocarbon group that optionally contains ether bond(s) is bonded.

(2) A magnetic recording disk comprising a substrate, a magnetic layer formed on the substrate, a protective layer formed on the magnetic layer and a lubricant layer formed on the protective layer, the lubricant layer being formed of a mixture of a compound (A) of the general formula (I),

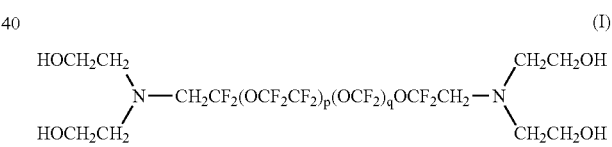

wherein each of p and q is an integer of 1 or more, and
a compound (B) having a perfluoropolyether main chain having two end moieties containing a carbon atom or an oxygen atom to which a hydroxyl-containing hydrocarbon group that optionally contains ether bond(s) is bonded.

(3) The magnetic recording disk as recited in the above (1) or (2), wherein the compound (B) represents at least one compound selected from compounds of the general formulae (II), (III), (IV) and (VII),

 (II)

 (III)

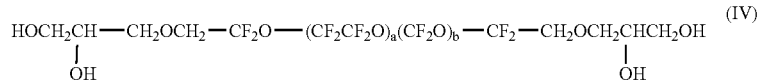 (IV)

HO—(CH$_2$CH$_2$—O)$_m$—CH$_2$—CF$_2$—(OC$_2$F$_4$)$_a$(OCF$_2$)$_b$—O—
CF$_2$—CH$_2$—(OCH$_2$CH$_2$)$_n$—OH     (VII)

wherein each of a, b, m and n is an integer of 1 or more.

(4) The magnetic recording disk as recited in the above (1), (2) or (3), wherein the lubricant layer contains the compound (A) and the compound (B) in a compound (A):compound (B) weight ratio of 2:8 to 8:2.

(5) The magnetic recording disk as recited in any one of the above (1) to (4), wherein the compound (A) has a weight average molecular weight (Mw) of 2,000 to 7,000 and has a polydispersity, represented by weight average molecular weight (Mw)/number average molecular weight (Mn), of 1.1 or less.

(6) The magnetic recording disk as recited in any one of the above (1) to (5), wherein the compound (B) has a weight average molecular weight (Mw) of 2,000 to 7,000 and has a polydispersity, represented by weight average molecular weight (Mw)/number average molecular weight (Mn), of 1.2 or less.

(7) The magnetic recording disk as recited in any one of the above (1) to (6), which is for a hard disk drive unit in a load unload method.

(8) The magnetic recording disk as recited in any one of the above (1) to (7), wherein said protective layer is a carbon-containing protective layer formed by a plasma CVD method.

(9) The magnetic recording disk as recited in any one of the above (1) to (8), wherein said lubricant layer coats the surface of said protective layer and has a coverage ratio β of 0.85 to 1.

(10) A process for the manufacture of a magnetic recording disk comprising a substrate, a magnetic layer formed on the substrate, a protective layer formed on the magnetic layer and a lubricant layer formed on the protective layer, the process comprising mixing a compound (A) of the general formula (I),

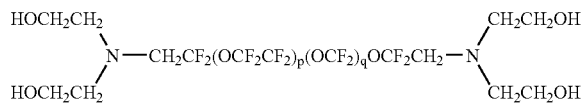
(I)

wherein each of p and q is an integer of 1 or more, with a compound (B) having a perfluoropolyether main chain having two end moieties containing a carbon atom or an oxygen atom to which a hydroxyl-containing hydrocarbon group that optionally contains ether bond(s) is bonded, and forming the said lubricant layer from the thus-obtained mixture.

Further, the above process for the manufacture of a magnetic recording disk includes the following preferred embodiments.

(11) A process for the manufacture of a magnetic recording disk as recited in the above (10), wherein the compound (B) represents at least one compound selected from compounds of the general formulae (II), (III), (IV) and (VII), HOCH$_2$—CF$_2$O—(CF$_2$CF$_2$O)$_a$(CF$_2$O)$_b$—CH$_2$OH     (II)

HOCH$_2$—CF$_2$O—(CF$_2$CF$_2$O)$_a$(CF$_2$O)$_b$—CF$_2$—CH$_2$OH     (III)

HO—(CH$_2$CH$_2$—O)$_m$—CH$_2$—CF$_2$—(OC$_2$F$_4$)$_a$(OCF$_2$)$_b$—O—
CF$_2$—CH$_2$—(OCH$_2$CH$_2$)$_n$—OH     (VII)

wherein each of a, b, m and n is an integer of 1 or more.

(12) A process for the manufacture of a magnetic recording disk as recited in the above (10) or (11), wherein the compound (A) and the compound (B) are mixed in a compound (A):compound (B) weight ratio of 2:8 to 8:2, and said lubricant layer is formed from the thus-obtained mixture.

(13) A process for the manufacture of a magnetic recording disk as recited in the above (10), (11) or (12), wherein a lubricant containing the compound (A) having a weight average molecular weight (Mw) of 2,000 to 7,000 and having a polydispersity, represented by weight average molecular weight (Mw)/number average molecular weight (Mn), of 1.1 or less is used as the lubricant containing the compound (A).

(14) A process for the manufacture of a magnetic recording disk as recited in any one of the above (10) to (13), wherein a lubricant containing the compound (B) having a weight average molecular weight (Mw) of 2,000 to 7,000 and having a polydispersity, represented by weight average molecular weight (Mw)/number average molecular weight (Mn), of 1.2 or less is used as the lubricant containing the compound (B).

(15) A process for the manufacture of a magnetic recording disk as recited in any one of the above (10) to (14), wherein the magnetic recording disk is for use in a load unload method.

EFFECT OF THE INVENTION

Figure 1:
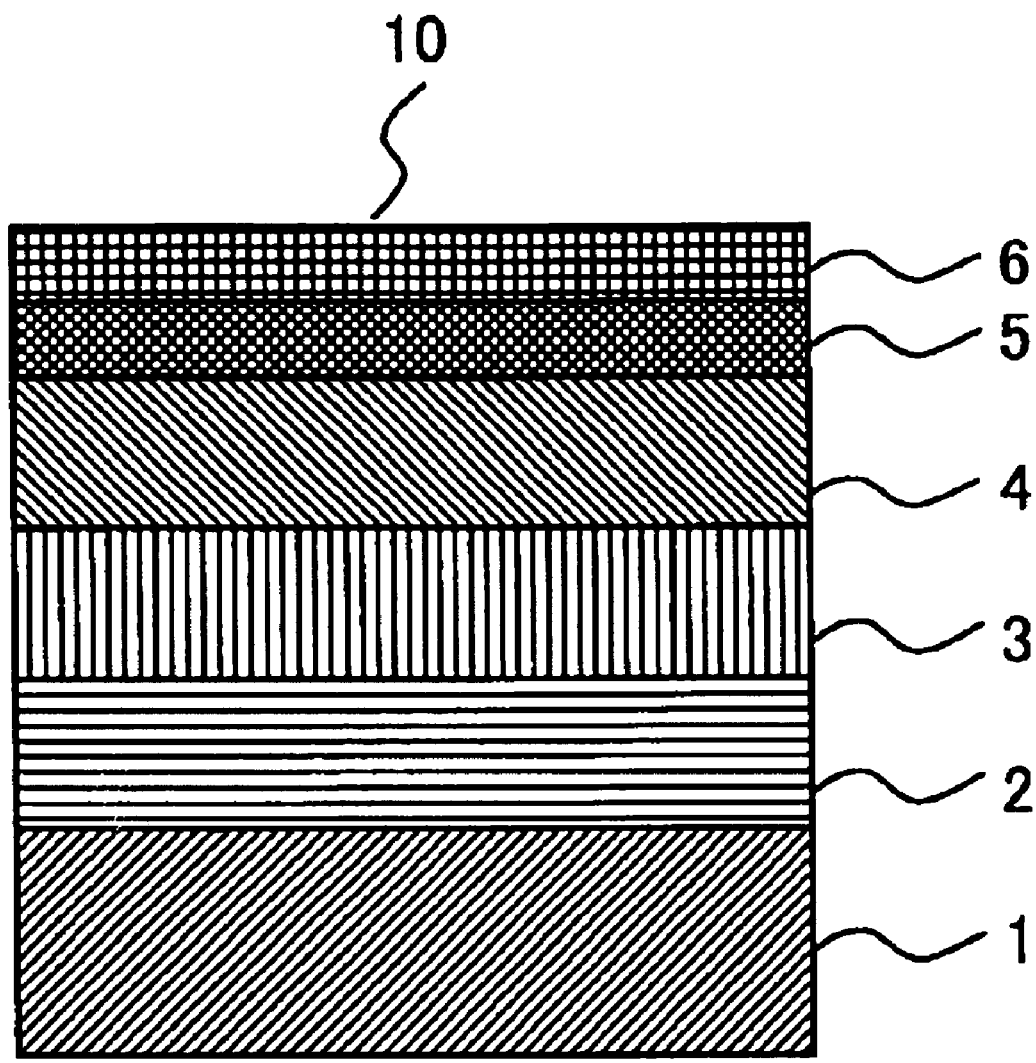
FIG. 1 is a schematic cross-sectional view of one example of the magnetic recording disk of the present invention, in which numeral 10 indicates a magnetic recording disk, 1 indicates a substrate, 2 indicates a seed layer, 3 indicates an undercoat layer, 4 indicates a magnetic layer, 5 indicates a protective layer and 6 indicates a lubricant layer.

According to the present invention, there can be obtained a magnetic recording disk having excellent lubrication, adhesion, heat-resistance and coating performances, so that the troubles of fly-stiction, corrosion, head clash, migration and the like can be prevented, and the magnetic recording disk of the present invention is suitable for increasing the information recording capacity.

PREFERRED EMBODIMENTS OF THE INVENTION

The magnetic recording disk of the present invention has a constitution in which at least a magnetic layer, a protective layer and a lubricant layer are consecutively formed on a substrate, and a combination of the following compounds (A) and (B) are incorporated into the above lubricant layer.

The compound (A) is a compound that has the structure of the general formula (I),

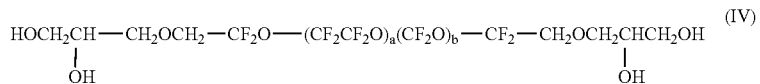

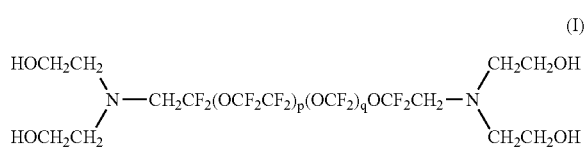

(I)

wherein each of p and q is an integer of 1 or more, and in which diethanolaminomethyl groups are bonded to carbon atoms of the two end moieties of a perfluoropolyether main chain, one diethanolaminomethyl group bonded to the carbon atom of one end moiety, one diethanolaminomethyl group bonded to the carbon atom of the other end moiety.

The above compound (A) suitably has lubrication performance based on its main chain and has high heat resistance and high capability of adhesion to a protective layer based on two $-CH_2CH_2OH$ functional groups of each of the two end moieties of the main chain. However, the functional groups have high capability of adhesion to the protective layer, and as a result, the lubrication performance is reduced. There is therefore a problem that the compound (A) is liable to cause a clash trouble, and it is difficult to use the compound (A) alone, which is the problem that the present inventors have sought to overcome.

On the other hand, the compound (B) has a structure in which its perfluoropolyether main chain has two end moieties each of which contains a carbon atom or a hydrogen atom to which a hydroxyl-containing hydrocarbon group that optionally contains an ether bond is bonded. The compound (B) suitably has flexible lubrication performance based on the perfluoropolyether main chain and capability of adhesion to the protective layer based on two terminal functional groups having hydroxyl groups. However, the compound (B) has a problem in low heat resistance. Further, the compound (B) is liable to cause a migration trouble and has a difficulty in suitable control in use. It is therefore difficult to use the compound (B) alone. These are problems that the present inventors have sought to overcome.

However, when the present inventors have prepared a magnetic recording disk having a lubricant layer containing these two compounds and tested it, it has been unexpectedly found that the suitable properties of these two compounds are synergistically exhibited and that the defects of these compounds can be controlled. The present invention has been accordingly completed.

In the above compound (B) for use in the present invention, the perfluoropolyether main chain has two end moieties each of which contains a carbon atom or an oxygen atom to which a hydroxyl-containing hydrocarbon group that optionally contains ether bond(s) is bonded, and preferably, the number of the hydroxyl of the hydroxyl-containing hydrocarbon group is 1 to 2. When the number of the above hydroxyl exceeds 2, the lubrication performance may decrease in some case. Examples of the compound (B) include compounds of the following general formulae (III) to (VII),

 (II)

 (III)

 (VI)

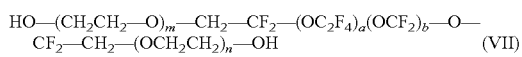 (VII)

wherein R is F or $CF_3$, each of a and b is an integer of 1 or more, c is an integer of 2 to 10, and each of m and n is an integer of 1 or more.

These compounds may be used alone or in combination. Of these compounds, the compound of the above general formula (II) is preferred in view of performances.

Further, as the compound (B) for use in the lubricant layer, the compounds of the general formulae (III), (IV) and (VII) are preferred, and each of these compounds is particularly preferred when the lubricant layer containing each of these compounds is combined with a protective layer formed by a plasma CVD method.

In the present invention, the lubricant layer preferably contains the above compound (A) and the above compound (B) in a weight ratio of 2:8 to 8:2. When the weight ratio of the compound (A) is smaller than the above range, the adhesion of the entire lubricant layer to the protective layer is low, and as a result, the fly stiction and corrosion troubles may be caused in some cases, and, further, the migration trouble may be caused in some case. When the weight ratio of the compound (A) is higher than the above range, the adhesion of the entire lubricant layer to the protective layer is enhanced, and as a result, the lubrication performance may be decreased in some case, and the head clash may be caused. The weight ratio of the compound (A) and the compound (B) is particularly preferably in the range of 4:6 to 6:4.

In the present invention, preferably, the above compound (A) has a weight average molecular weight (Mw) of 2,000 to 7,000 and has a polydispersity, represented by weight average molecular weight (Mw)/number average molecular weight (Mn), of 1.1 or less. When the compound (A) has the above molecular weight distribution, the compound (A) has a main chain length (length of main chain) having lubrication performance suitable for a magnetic recording disk. When the above weight average molecular weight (Mw) is less than 2,000, undesirably, impurities are sometimes contained in a large amount. When it exceeds 7,000, undesirably, such a compound has a high viscosity and sometimes causes fly stiction. Further, when the polydispersity exceeds 1.1, the molecular weight distribution is too broad, and undesirably, a low-molecular-weight component and a high-molecular-weight component come to be contained.

In the compound (A) of the above general formula (I), each of p and q is an integer of 1 or more. The integers of p and q can be properly determined such that the weight average molecular weight of the compound (A) is in the range of 2,000 to 7,000.

The above compound (B) has a weight-average molecular weight (Mw) of 2,000 to 7,000 and has a polydispersity, represented by weight average molecular weight (Mw)/number average molecular weight (Mn), of 1.2 or less.

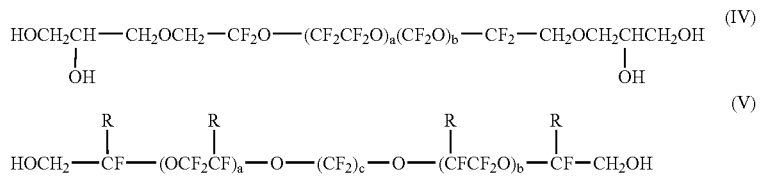

When the compound (B) has the above molecular weight distribution, the compound (B) has a perfluoropolyether main chain length having lubrication performance suitable for a magnetic recording disk.

The compound of the general formula (II) is liable to contain lower-molecular-weight impurities. When the compound of the general formula (II) has the molecular weight distribution as defined in the present invention, the above impurities can be excluded, and the effect of the present invention can be suitably exhibited. The compound of the general formula (II) particularly preferably has a weight average molecular weight of 3,000 to 5,000 and a polydispersity of 1.1 or less. When the above weight average molecular weight is less than 2,000, undesirably, impurities are sometimes contained in a large amount. When it exceeds 7,000, undesirably, such a compound has a high viscosity and sometimes causes fly stiction. Further, when the polydispersity exceeds 1.2, the molecular weight distribution is too broad, and undesirably, a low-molecular-weight component and a high-molecular-weight component come to be contained. In the compound of the above formula (II), each of a and b is an integer of 1 or more. The integers of a and b can be properly determined such that the weight average molecular weight of the compound of the general formula (II) is in the range of 2,000 to 7,000.

The above-discussed preferred ranges of the weight average molecular weight (Mw) and the polydispersity represented by the weight average molecular weight (Mw)/number average molecular weight (Mn) in the compound of the general formula (II) can be applied to the compounds of the general formulae (III), (IV) and (VII) without any modification. Further, in the compounds of the general formulae (III), (IV) and (VII), each of a and b is an integer of 1 or more, and the integers of a and b can be properly determined such that the weight average molecular weight of each compound is in the range of 2,000 to 7,000.

In the present invention, the above weight average molecular weights (Mw) and the number average molecular weights (Mn) are values obtained by measurements according to a gel permeation chromatography (GPC) method using polymethyl methacrylates having different molecular weights as reference substances.

In the present invention, the method of adjusting the molecular weight distribution (weight average molecular weight and polydispersity) of each of the compound (A) and the compound (B) is not specially limited so long as it is a purification method capable of molecular weight fractionation, while it is preferred to use compounds purified by a supercritical extraction method. When the molecular weight fractionation is carried out by a supercritical extraction method, there can be obtained compounds suitably having the above molecular weight distributions.

In the present invention, the lubricant layer may contain other lubricant known as a lubricant for a conventional magnetic recording disk and various additives known as additives for a lubricant layer, such as a deterioration-preventing agent for a perfluoropolyether lubricant, as required so long as the object of the present invention is not impaired. Examples of the other known lubricant above include a compound in which one end moiety of a perfluoropolyether main chain contains a hydroxyl-containing hydrocarbon group, a fluorine-containing azide compound having a fluorocarbon chain and having at least one azide group, and a compound in which at least one end moiety of a perfluoropolyether main chain has a phosphazene ring.

According to the present invention, further, there is provided a magnetic recording disk comprising a substrate, a magnetic layer formed on the substrate, a protective layer formed on the magnetic layer and a lubricant layer formed on the protective layer, the lubricant layer being formed of a mixture of the above compound (A) and the above compound (B), and there is also provided a process for the manufacture of a magnetic recording disk comprising a substrate, a magnetic layer formed on the substrate, a protective layer formed on the magnetic layer and a lubricant layer formed on the protective layer, the process comprising mixing the compound (A) and the compound (B) and forming the above lubricant layer from the thus-obtained mixture.

The above lubricant mixture is prepared and applied onto the protective layer to form a lubricant layer, whereby the magnetic recording disk of the present invention can be suitably obtained.

In the present invention, the method of forming the lubricant layer is not specially limited, and it can be selected from various layer-forming methods such as a dip coating method, a spin coating method, a spray method and a vapor coating method. In the present invention, further, when the lubricant layer is formed from a dispersion of the lubricant (s) in a solvent, any solvent can be selected so long as it can properly disperse the lubricants. Particularly, a fluorine-containing solvent is preferred, since it can properly disperse and dissolve the lubricant containing the perfluoropolyether as a main chain. When VERTREL XF supplied by DU PONT-MITSUI FLUOROCHEMICALS COMPANY, LTD., or HFE7100 supplied by 3M Co., Ltd. is used as a fluorine-containing solvent, particularly preferably, there can be obtained a solution or dispersion in which the compound (A) and the compound (B) are properly dissolved.

In the present invention, the thickness of the lubricant layer is preferably in the range of 0.5 to 1.8 nm, particularly preferably in the range of 0.7 to 1.5 nm. When the above thickness is less than 0.5 nm, undesirably, the lubrication performance of the lubricant layer is impaired. When it exceeds 1.8 nm, undesirably, an upper layer portion of the lubricant layer may be caused to have low adhesion to the protective layer in some cases.

In the present invention, the ratio of coverage of the lubricant layer on the protective layer surface (coverage ratio $\beta$) is preferably 0.85 or more. The results of Examples 6 to 20 of the present invention and Comparative Examples 3 to 8 to be described later show that when the coverage ratio $\beta$ is less than 0.85, the LUL durability is degraded. When the magnetic recording disk is according to the LUL method, therefore, the coverage ratio $\beta$ is preferably 0.85 or more.

Further, it is not necessary to impose the special limitation on the upper limit of the coverage ratio $\beta$, and the coverage ratio $\beta$ can be in the range of 0.85 to 1. In Examples to be described later, suitable LUL durability can be obtained even when the coverage ratio $\beta$ is 0.99.

The ratio of coverage of the lubricant layer on the protective layer (coverage ratio $\beta$) in the present invention refers to a coverage ratio $\beta$ obtained by calculation based on measurement by X-ray photoelectron spectroscopy (XPS method). For specific calculation of the coverage ratio $\beta$ on the basis of measurement by XPS, there can be employed a calculation method described in Japanese Patent 3,449,637 or U.S. Pat. No. 6,099,981. The magnetic recording disk of the present invention comprises a substrate, a magnetic layer formed on the substrate, a protective layer formed on the magnetic layer and a lubricant layer formed on the protective layer. When the protective layer is dotted with the lubricant layers containing the compound (A) and/or the compound (B), the lubricant layer preferably has a coverage ratio β, calculated on the basis of measurement by the X-ray photoelectron spectroscopy, of 0.85 or more.

In the present invention, preferably, the magnetic recording disk is heat-treated after the lubricant layer is formed. The above heat treatment is preferred in the present invention, since the heat treatment can improve adhesion between the lubricant layer and the protective layer and can improve the adhesion strength of the lubricant layer. The heat treatment is preferably carried out at a temperature of 100 to 180° C. When the heat treatment temperature is lower than 100° C., the adhesion is not sufficient. When it exceeds 180° C., undesirably, the lubricant may be thermally decomposed. Further, the heat treatment is preferably carried out for 30 to 120 minutes.

In the present invention, the protective layer is preferably a carbon-containing protective layer. The carbon-containing protective layer is suitable since it has high affinity with the end functional groups of the compound (A) and the compound (B), and can serve to improve the adhesion of the lubricant layer to the protective layer. The carbon-containing protective layer is preferably a hydrogenated carbon protective layer or other protective layer such as a nitrogenated carbon protective layer or a hydrogenated-nitrogenated carbon protective layer. The protective layer preferably has a thickness of 3 to 8 nm. When the above thickness is less than 3 nm, the protective layer does not fully function as such, and a head clash trouble may be caused. When it exceeds 8 nm, the distance between the magnetic layer and a magnetic head is too large, which is undesirable for attaining a high S/N ratio.

In the present invention, the substrate is preferably a glass substrate. A glass substrate is excellent in surface smoothness and suitable for high-density recording. As a glass substrate, a chemically strengthened aluminosilicate glass substrate is preferred.

In the present invention, the carbon-containing protective layer is particularly preferably a hydrogenated nitrogenated carbon protective layer. Concerning the method of forming the carbon-containing protective layer, any one of a carbon-containing protective layer formed by a sputtering method and a carbon-containing protective layer formed by a plasma CVD method can be suitably used. Particularly, when a carbon-containing protective layer formed by a plasma CVD method is combined with the present invention, a synergistic effect can be particularly preferably produced.

In the present invention, when the protective layer is a carbon-containing protective layer such as a hydrogenated carbon protective layer, a nitrogenated carbon (carbon nidride) protective layer or a hydrogenated nitrogenated carbon protective layer, the content of hydrogen in the entire protective layer, measured by a hydrogen forward scattering spectrometry method (HFS method), is preferably 3 at % to 25 at %. Concerning the content of nitrogen, the content of nitrogen based on carbon, measured by an X-ray photoelectron spectroscopy (XPS method), is preferably 3 at % to 16 at %.

In the present invention, the substrate preferably has a surface roughness, Rmax, of 6 nm or less and a surface roughness, Ra, of 0.6 nm or less. When the substrate has the above smoothness, the flying height of a magnetic head can be set to be 12 nm or less, while there is a problem that the lubricant layer is liable to move due to the surface smoothness. In the present invention, however, the movement of the lubricant layer can be properly suppressed. The above Rmax and Ra are as defined in JIS B0601.

In the present invention, the magnetic layer is not specially limited, and it may be a magnetic layer according to an in-plane recording method or may be a magnetic layer according to a perpendicular recording method. A CoPt-based magnetic layer is preferred since a high coercive force and a high reproduction output can be obtained.

In the magnetic recording disk of the present invention, an undercoat layer may be provided between the substrate and the magnetic layer as required, and a seed layer may be provided between the undercoat layer and the substrate. The above undercoat layer is selected from a Cr layer or an alloy layer such as a CrMo, CrW, CrV or CrTi alloy layer. The seed layer is selected from an NiAl or AlRu alloy layer.

While the present invention is suitably applied to a magnetic recording disk according to the LUL method, the present invention can be also applied to a magnetic recording disk according to the CSS method and a magnetic recording disk according to a contact-recording method.

EXAMPLES

The present invention will be explained further in detail with reference to Examples hereinafter, while the present invention shall not be limited by these Examples.

Magnetic recording disks were tested for performances according to the following methods.

(1) Lubricant Layer Adhesion Performance Test

A lubricant layer was tested for evaluating a performance of adhesion to a protective layer. First, a magnetic recording disk is measured for a lubricant layer thickness by an FTIR (Fourier transform infrared spectroscopy) method. Then, the magnetic recording disk is immersed in a fluorine-containing solvent, Vertrel XF, for 1 minute. When the magnetic recording disk is immersed in the solvent, a lubricant layer portion having low adhesion strength comes to be dispersed or dissolved in the solvent, but a portion having high adhesion strength can remain on the protective layer. Then, the magnetic recording disk is drawn up from the solvent and again measured for a lubricant layer thickness by the FTIR method. The ratio of the thickness of the lubricant layer after the immersion in the solvent to the thickness of the lubricant layer before the immersion in the solvent will be called a lubricant layer adhesion ratio (bonded ratio). It can be said that the higher the bonded ratio is, the higher the performance of adhesion of the lubricant layer to the protective layer is. The bonded ratio is preferably at least 70%. When the bonded ratio is less than 70%, such a lubricant layer has poor performance of adhesion and may cause a fly stiction trouble or corrosion trouble in some cases.

(3) LUL Durability Test

The LUL test uses a 2.5-inch (65-mm) magnetic recording disk drive unit that turns at a rate of 5,400 rpm and a magnetic head that is operated with a flying height of 12 nm. A negative pressure air bearing surface slider (NPAB slider) is used as a slider of the magnetic head, and a GMR magneto-resistance effect element is used as a reproducing element. A shield portion is formed of an NiFe alloy. A magnetic recording disk is placed in the above magnetic recording disk drive unit, and the LUL operation is continuously carried out with the above magnetic head, to measure the number of times of the LUL operation durability. After the LUL durability test, the magnetic recording disk surface and the magnetic head surface are observed visually and through an optical microscope for failures such as scratches and soiling. In the LUL durability test, a magnetic recording disk is required to be durable against at least 400,000 times of the LUL operations without any trouble, and a magnetic recording disk durable against at least 600,000 times of the LUL operations is suitable. In a use environment of a general hard disk drive (HDD), it is said that more than 600,000 times of the LUL operations are conducted when HDD is used for approximately 10 years.

(3) Fly Stiction Test

100 Magnetic recording disks are glide-tested with a glide head with a flying height of 6 nm, to see whether or not a fly stiction phenomenon is caused. When a fly stiction phenomenon takes place, the flying position of the glide head abruptly changes to an unusual position, so that the occurrence of the fly sticking can be detected by monitoring a signal from a piezoelectric element attached to the glide head. It is said that the ratio of acceptance based on the inspection by the fly stiction test is preferably required to be at least 90%. When it is less than 90%, the production yield is low, the production cost increases, and HDD troubles are liable to be caused.

(4) Coverage Ratio β

The ratio of coverage of a lubricant layer on protective layer (coverage ratio β) was calculated on the basis of measurement by X-ray photoelectron spectroscopy (XPS). As a specific calculation method, there was employed the calculation method described in Japanese Patent 3,449,637 (or U.S. Pat. No. 6,099,981).

Example 1

FIG. 1 is cross-sectional view of a magnetic recording disk 10 for schematically showing the layer structure of one embodiment of the magnetic recording disk of the present first invention. In the magnetic recording disk 10, a seed layer 2, an undercoat layer 3, a magnetic layer 4, a protective layer 5 and a lubricant layer 6 are consecutively formed on a substrate 1.

The substrate 1 is a chemically strengthened aluminosilicate glass substrate, and the main surface thereof is mirror-polished and hence has an Rmax of 4.8 nm and an Ra of 0.43 nm. Further, the glass substrate 1 has a diameter of 65 mm and a thickness of 0.635 mm and is used for a 2.5-inch magnetic recording disk.

The seed layer 2 is formed of an NiAl alloy containing 50 mol % of Ni and 50 mol % of Al and has a thickness of 30 nm.

The undercoat layer 3 is formed of a CrMo alloy containing 80 mol % of Cr and 20 mol % of Mo and has a thickness of 8 nm.

The magnetic layer 4 is formed of a CoPt alloy containing 62 mol % of Co, 20 mol % of Cr, 12 mol % of Pt and 6 mol % of B and has a thickness of 15 nm.

The protective layer 5 is formed of hydrogenated carbon and has a thickness of 5 nm.

The lubricant layer 6 contains the compound (A) of the formula (I) and the compound (B) of the formula (II) in a weight ratio of 1:1 and has a thickness of 1 nm.

The process for manufacturing the magnetic recording disk 10 of this Example will be explained below.

First, the seed layer 2, the undercoat layer 3 and the magnetic layer 4 was consecutively formed on the substrate 1 in an Ar gas atmosphere by a DC magnetron sputtering method. Then, the protective layer 5 was formed by sputtering a carbon target in an Ar gas/hydrogen gas mixed atmosphere (having a hydrogen gas content of 30% by volume) similarly according to a DC magnetron sputtering method.

Then, a lubricant containing the compound (A) of the formula (I) having a weight average molecular weight of 3,000 and a polydispersity of 1.08, prepared by molecular weight purification, and a lubricant containing the compound (B) of the formula (II) having a weight average molecular weight of 3,000 and a polydispersity of 1.06, prepared by molecular weight purification, purified by a supercritical extraction method, were mixed in a compound (A):compound (B) weight ratio of 1:1, to prepare a lubricant mixture. The lubricant mixture was dispersed and dissolved in VERTREL XF that was fluorine-containing solvent supplied by DU PONT-MITSUI FLUOROCHEMICALS COMPANY, Ltd., to prepare a solution having a lubricant mixture concentration of 0.02% by weight. The above magnetic recording disk having layers formed up to the protective layer 5 was dipped in the above solution to form the lubricant layer 6. Then, the magnetic recording disk 10 was heat-treated in a vacuum calcining furnace at 130° C. for 90 minutes, to give a 2.5-inch magnetic recording disk 10 of this Example. The above magnetic recording disk 10 was evaluated for performances. Table 1 shows the results.

Example 2–5 and Comparative Example 1 and 2

Magnetic recording disks were produced in the same manner as in Example 1 except that the lubricant mixture was replaced with a lubricant mixture containing the compound (A) of the formula (I) and the compound (B) of the formula (II) in a compound (A):compound (B) weight ratio of 4:6 (Example 2), 2:8 (Example 3), 6:4 (Example 4) or 8:2 (Example 5) or that the lubricant mixture was replaced with a lubricant containing the compound of the formula (II) alone (Comparative Example 1) or a lubricant containing the compound of the formula (I) alone (Comparative Example 2).

The above magnetic recording disks were evaluated for performances. Table 1 shows the results.

TABLE 1

| | Compound (A):Compound (B) (weight ratio) | Bonded ratio (%) |
|---|---|---|
| Example 1 | 1:1 | 85% |
| Example 2 | 4:6 | 84% |
| Example 3 | 2:8 | 79% |
| Example 4 | 6:4 | 85% |
| Example 5 | 8:2 | 90% |
| CEx. 1 | 0:1 | 55% |
| CEx. 2 | 1:0 | 97% |

| | LUL Durability test | | | Fly stiction test | |
|---|---|---|---|---|---|
| | Number of times of durable operations | Disk surface | Head surface | Acceptance ratio | |
| Ex. 1 | 800,000; operated | Excellent | Excellent | 100% | No fly stiction |
| Ex. 2 | 800,000; operated | Excellent | Excellent | 100% | No fly stiction |
| Ex. 3 | 600,000; operated | Excellent | Excellent | 100% | No fly stiction |
| Ex. 4 | 800,000; operated | Excellent | Excellent | 100% | No fly stiction |
| Ex. 5 | 600,000; operated | Excellent | Excellent | 100% | No fly stiction |
| CEx. 1 | 200,000; failed | Soiled | Head element and shielding portion corroded, soiled. | 20% | Fly stiction occurred |
| CEx. 2 | 300,000; failed | Head clash, scratched | Head clash, scratched | 50% | Clash occurred |

Ex. = Example,
CEx. = Comparative Example

Table 1 shows the following. All of the magnetic recording disks having lubricant layers according to the present invention (Examples 1 to 5) had a bonded ratio of 75% or more. In the LUL durability test, further, all of the magnetic recording disks according to the present invention had durability against at least 600,000 times of the LUL operations, and failures such as scratches and soiling were not observed on any disk surface or any head surface after the durability test. Further, none of the above magnetic recording disks caused the fly stiction phenomenon, and the ratio of the acceptance was 100%.

In contrast, the magnetic recording disk having a lubricant layer containing the compound (B) of the general formula (II) alone (Comparative Example 1) had a low bonded ratio and was defective when tested in the LUL durability test. Further, it also caused a fly stiction phenomenon. The magnetic recording disk having a lubricant layer containing the compound (A) of the formula (I) alone (Comparative Example 2) had a high bonded ratio, but it had scratches caused by head clash in the LUL durability test and caused a fly stiction phenomenon.

Examples 6–10 and Comparative Examples 3 and 4

In Examples 6 to 10 and Comparative Examples 3 and 4, a hydrogenated nitrogenated carbon protective layer was employed as the protective layer 5, and the protective layer had a hydrogen content of 13 at % based on the entire hydrogenated nitrogenated carbon (H/CHN ratio) and a nitrogen content of 8 at % based on the carbon (N/C ratio). The hydrogen content was measured by a hydrogen forward scattering spectrometry method (HFS method), and the nitrogen content was measured by X-ray photoelectron spectroscopy (XPS method).

In each Example and Comparative Example, the protective layer 5 was formed by a plasma CVD method in place of the sputtering method in Example 1. According to the plasma CVD method, a dense protective layer suitable for a magnetic recording disk according to the LUL method can be formed as compared with the case of forming a carbon-containing protective layer by a sputtering method. It is preferred to use a lower hydrocarbon as a feed gas, and these Examples used acetylene gas. The protective layer 5 had a thickness of 5 nm.

A lubricant layer 6 was formed in the same manner as in Example 1 except that the lubricant mixture containing the compound of the formula (I) as a compound (A) and the compound of the formula (II) as a compound (B) was replaced with a lubricant mixture containing the compound of the formula (I) as a compound (A) and the compound of the formula (III) as a compound (B).

With regard to the compound (A), the purification method and the molecular weight distribution (weight average molecular weight, number average molecular weight and polydispersity) were the same as those in Example 1. The compound (B) was purified by the same method as that in Example 1, and it had a weight average molecular weight of 4,000 and a polydispersity of 1.1. Each lubricant layer 6 had a thickness of 1 nm.

When magnetic recording disks of Examples 6 to 10 and Comparative Examples 3 and 4 were produced, the compound (A):compound (B) weight ratio was variously changed as shown in Table 2, and the thus-obtained magnetic recording disks were evaluated for performances in the same manner as in Example 1. Table 2 shows the results. In these Examples 6 to 10 and Comparative Examples 3 and 4, the flying height of a magnetic head in the LUL durability test was set at 10 nm, and the flying height of a glide head in the fly stiction test was set at 5.5 nm.

TABLE 2

| | Compound (A):Compound (B) (weight ratio) | Bonded ratio (%) | Coverage ratio β |
|---|---|---|---|
| Example 6 | 1:1 | 87% | 0.86 |
| Example 7 | 4:6 | 87% | 0.86 |
| Example 8 | 2:8 | 83% | 0.87 |
| Example 9 | 6:4 | 87% | 0.86 |
| Example 10 | 8:2 | 89% | 0.85 |
| CEx. 3 | 0:1 | 65% | 0.81 |
| CEx. 4 | 1:0 | 99% | 0.79 |

| | LUL Durability test | | | Fly stiction test | |
|---|---|---|---|---|---|
| | Number of times of durable operations | Disk surface | Head surface | Acceptance ratio | |
| Ex. 6 | 900,000; operated | Excellent | Excellent | 100% | No fly stiction |
| Ex. 7 | 900,000; operated | Excellent | Excellent | 100% | No fly stiction |
| Ex. 8 | 800,000; operated | Excellent | Excellent | 100% | No fly stiction |
| Ex. 9 | 900,000; operated | Excellent | Excellent | 100% | No fly stiction |
| Ex. 10 | 800,000; operated | Excellent | Excellent | 100% | No fly stiction |
| CEx. 3 | 300,000; failed | Soiled | Head element and shielding portion corroded, soiled. | 20% | Fly stiction occurred |
| CEx. 4 | 300,000; failed | Head clash, scratched | Head clash, scratched | 50% | Clash occurred |

Ex. = Example,
CEx. = Comparative Example

Example 11–15 and Comparative Examples 5 and 6

In Examples 11 to 15 and Comparative Examples 5 and 6, as a protective layer 5, a hydrogenated nitrogenated carbon protective layer was formed by a plasma CVD method in the same manner as in Examples 6 to 10 and Comparative Examples 3 and 4 except that the content of hydrogen based on the entire hydrogenated nitrogenated carbon was changed to 12 at % and that the content of nitrogen based on the carbon was changed to 7 at %. The protective layer 5 had a thickness of 5 nm.

A lubricant layer 6 was formed in the same manner as in Example 1 except that the lubricant mixture containing the compound of the formula (I) as a compound (A) and the compound of the formula (II) as a compound (B) was replaced with a lubricant mixture containing the compound of the formula (I) as a compound (A) and the compound of the formula (IV) as a compound (B).

With regard to the compound (A), the purification method and the molecular weight distribution (weight average molecular weight, number average molecular weight and polydispersity) were the same as those in Example 1. The compound (B) was purified by the same method as that in Example 1, and it had a weight average molecular weight of 5,000 and a polydispersity of 1.1. Each lubricant layer 6 had a thickness of 1 nm.

When magnetic recording disks of Examples 11 to 15 and Comparative Examples 5 and 6 were produced, the compound (A):compound (B) weight ratio was variously changed as shown in Table 3, and the thus-obtained magnetic recording disks were evaluated for performances in the same manner as in Example 1. Table 3 shows the results. In these Examples 11 to 15 and Comparative Examples 5 and 6, the flying height of a magnetic head in the LUL durability test was set at 10 nm, and the flying height of a glide head in the fly stiction test was set at 5.5 nm.

TABLE 3

|  | Compound (A):Compound (B) (weight ratio) | Bonded ratio (%) | Coverage ratio β |
|---|---|---|---|
| Example 11 | 1:1 | 90% | 0.99 |
| Example 12 | 4:6 | 90% | 0.96 |
| Example 13 | 2:8 | 89% | 0.93 |
| Example 14 | 6:4 | 90% | 0.95 |
| Example 15 | 8:2 | 93% | 0.90 |
| CEx. 5 | 0:1 | 86% | 0.83 |
| CEx. 6 | 1:0 | 99% | 0.79 |

| | LUL Durability test | | | Fly stiction test | |
|---|---|---|---|---|---|
| | Number of times of durable operations | Disk surface | Head surface | Acceptance ratio | |
| Ex. 11 | 900,000; operated | Excellent | Excellent | 100% | No fly stiction |
| Ex. 12 | 900,000; operated | Excellent | Excellent | 100% | No fly stiction |
| Ex. 13 | 800,000; operated | Excellent | Excellent | 100% | No fly stiction |
| Ex. 14 | 900,000; operated | Excellent | Excellent | 100% | No fly stiction |
| Ex. 15 | 800,000; operated | Excellent | Excellent | 100% | No fly stiction |
| CEx. 5 | 300,000; failed | Head clash, scratched | Head clash, scratched | 60% | Clash occurred |
| CEx. 6 | 300,000; failed | Head clash, scratched | Head clash, scratched | 50% | Clash occurred |

Ex. = Example,
CEx. = Comparative Example

Examples 16–20 and Comparative Examples 7 and 8

In Examples 16 to 20 and Comparative Examples 7 and 8, as a protective layer 5, a hydrogenated nitrogenated carbon protective layer was formed by a plasma CVD method in the same manner as in Examples 6 to 10 and Comparative Examples 3 and 4 except that the content of hydrogen based on the entire hydrogenated nitrogenated carbon was changed to 10 at % and that the content of nitrogen based on the carbon was changed to 6 at %. The protective layer 5 had a thickness of 5 nm.

A lubricant layer 6 was formed in the same manner as in Example 1 except that the lubricant mixture containing the compound of the formula (I) as a compound (A) and the compound of the formula (II) as a compound (B) was replaced with a lubricant mixture containing the compound of the formula (I) as a compound (A) and the compound of the formula (VII) as a compound (B).

With regard to the compound (A), the purification method and the molecular weight distribution (weight average molecular weight, number average molecular weight and polydispersity) were the same as those in Example 1. The compound (B) was purified by the same method as that in Example 1, and it had a weight average molecular weight of 3,000 and a polydispersity of 1.05. Each lubricant layer 6 had a thickness of 1 nm.

When magnetic recording disks of Examples 16 to 20 and Comparative Examples 7 and 8 were produced, the compound (A):compound (B) weight ratio was variously changed as shown in Table 4, and the thus-obtained magnetic recording disks were evaluated for performances in the same manner as in Example 1. Table 4 shows the results. In these Examples 16 to 20 and Comparative Examples 7 and 8, the flying height of a magnetic head in the LUL durability test was set at 10 nm, and the flying height of a glide head in the fly stiction test was set at 5.5 nm.

TABLE 4

|  | Compound (A):Compound (B) (weight ratio) | Bonded ratio (%) | Coverage ratio β |
|---|---|---|---|
| Example 16 | 1:1 | 88% | 0.92 |
| Example 17 | 4:6 | 88% | 0.92 |
| Example 18 | 2:8 | 86% | 0.92 |
| Example 19 | 6:4 | 89% | 0.91 |
| Example 20 | 8:2 | 91% | 0.90 |
| CEx. 7 | 0:1 | 81% | 0.82 |
| CEx. 8 | 1:0 | 99% | 0.79 |

| | LUL Durability test | | | Fly stiction test | |
|---|---|---|---|---|---|
| | Number of times of durable operations | Disk surface | Head surface | Acceptance ratio | |
| Ex. 16 | 900,000; operated | Excellent | Excellent | 100% | No fly stiction |
| Ex. 17 | 900,000; operated | Excellent | Excellent | 100% | No fly stiction |
| Ex. 18 | 800,000; operated | Excellent | Excellent | 100% | No fly stiction |
| Ex. 19 | 900,000; operated | Excellent | Excellent | 100% | No fly stiction |
| Ex. 20 | 800,000; operated | Excellent | Excellent | 100% | No fly stiction |
| CEx. 7 | 300,000; failed | Soiled | Head element and shielding portion corroded, soiled. | 30% | Fly stiction occurred |
| CEx. 8 | 300,000; failed | Head clash, scratched | Head clash, scratched | 50% | Clash occurred |

Ex. = Example,
CEx. = Comparative Example

As shown in Tables 2 to 4, the magnetic recording disks according to the present invention had excellent properties (performances) with regard to the bonded ratio, the coverage ratio β, the LUL durability test and the fly stiction test. In the magnetic recording disk of the present invention, particularly, when the lubricant layer according to the present invention and a carbon-containing protective layer formed by a plasma CVD method are combined, there can be produced functions and effects such as excellent LUL durability and the like. Further, when the coverage ratio β is adjusted to 0.85 or more and increased so, the lubricant layer can more reliably exhibit its functions, so that the magnetic recording disk is improved in LUL durability.

Industrial Utility

Having the high-adhesion lubricant layer that is capable of preventing the fly stiction trouble and the corrosion trouble at an extremely low level of flying height and which is capable of preventing the migration at a high-speed rotation, the magnetic recording disk of the present invention is particularly suitable for use with a magnetic recording disk drive unit according to the LUL method.

What is claimed is:

1. A magnetic recording disk comprising a substrate, a magnetic layer formed on the substrate, a protective layer formed on the magnetic layer and a lubricant layer formed on the protective layer, the lubricant layer containing a compound (A) of the general formula (I),

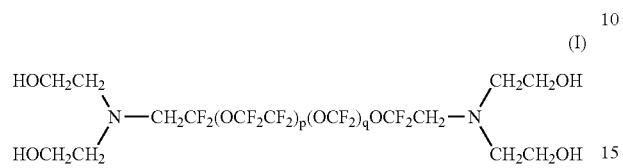

wherein each of p and q is an integer of 1 or more, and a compound (B) having a perfluoropolyether main chain having two end moieties each of which contains a carbon atom or an oxygen atom to which a hydroxyl-containing hydrocarbon group that optionally contains an ether bond(s) is bonded.

2. The magnetic recording disk of claim 1, wherein the compound (B) represents at least one compound selected from compounds of the general formulae (II), (III), (IV) and (VII),

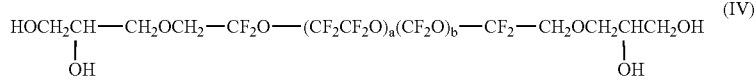

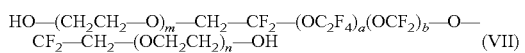

wherein each of a, b, m and n is an integer of 1 or more.

3. The magnetic recording disk of claim 1, wherein the lubricant layer contains the compound (A) and the compound (B) in a weight ratio of 2:8 to 8:2.

4. The magnetic recording disk of claim 1, wherein the compound (A) has a weight average molecular weight (Mw) of 2,000 to 7,000 and has a polydispersity, represented by weight average molecular weight (Mw)/number average molecular weight (Mn), of 1.1 or less.

5. The magnetic recording disk of claim 1, wherein the compound (B) has a weight average molecular weight (Mw) of 2,000 to 7,000 and has a polydispersity, represented by weight average molecular weight (Mw)/number average molecular weight (Mn), of 1.2 or less.

6. The magnetic recording disk of claim 1, which is for a hard disk drive unit in a load unload method.

7. The magnetic recording disk of claim 1, wherein said protective layer is a carbon-containing protective layer formed by a plasma CVD method.

8. The magnetic recording disk of claim 1, said lubricant layer coats the surface of said protective layer and has a coverage ratio β of 0.85 to 1.

9. A magnetic recording disk comprising a substrate, a magnetic layer formed on the substrate, a protective layer formed on the magnetic layer and a lubricant layer formed on the protective layer, the lubricant layer being formed of a mixture of a compound (A) of the general formula (I),

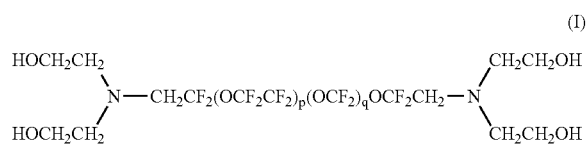

wherein each of p and q is an integer of 1 or more, and a compound (B) having a perfluoropolyether main chain having two end moieties containing a carbon atom or an oxygen atom to which a hydroxyl-containing hydrocarbon group that optionally contains ether bond(s) is bonded.

10. A process for the manufacture of a magnetic recording disk comprising a substrate, a magnetic layer formed on the substrate, a protective layer formed on the magnetic layer and a lubricant layer formed on the protective layer, the process comprising mixing a compound (A) of the general formula (I),

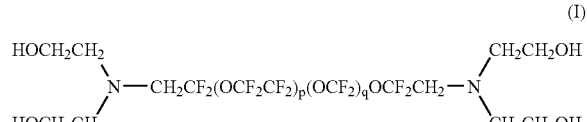

wherein each of p and q is an integer of 1 or more, with a compound (B) having a perfluoropolyether main chain having two end moieties containing a carbon atom or an oxygen atom to which a hydroxyl-containing hydrocarbon group that optionally contains ether bond(s) is bonded, and forming the said lubricant layer from the thus-obtained mixture.

* * * * *